United States Patent [19]

Pall

[11] 4,112,159

[45] * Sep. 5, 1978

[54] CONTINUOUS PRODUCTION OF TUBULAR MODULAR FILTER ELEMENTS USING NONWOVEN WEBS FROM THERMOPLASTIC FIBERS AND PRODUCTS

[75] Inventor: David B. Pall, Roslyn Estates, N.Y.

[73] Assignee: Pall Corporation, Glen Cove, N.Y.

[*] Notice: The portion of the term of this patent subsequent to Jun. 28, 1994, has been disclaimed.

[21] Appl. No.: 649,001

[22] Filed: Jan. 14, 1976

Related U.S. Application Data

[63] Continuation-in-part of Ser. No. 393,688, Aug. 31, 1973, Pat. No. 3,933,557.

[51] Int. Cl.² .............................................. B01D 29/10
[52] U.S. Cl. ..................................... 428/36; 210/453; 210/494 R; 210/497.1; 428/222; 428/303

[58] Field of Search .................. 156/167, 172, 173, 62, 156/62.6, 69, 174; 210/497, 497.1, 503, 508, 454, 453, 494 R, 507, 496; 428/35, 36, 288, 222, 296, 906, 294, 303

[56] References Cited

U.S. PATENT DOCUMENTS

| | | | |
|---|---|---|---|
| 2,584,387 | 2/1952 | Harvuot | 210/507 |
| 2,946,449 | 7/1960 | Shaw | 210/496 |
| 3,063,888 | 11/1962 | Howard et al. | 210/496 |
| 3,526,557 | 9/1970 | Taylor, Jr. | 156/167 |
| 3,801,400 | 4/1974 | Vogt et al. | 156/167 |
| 3,825,380 | 7/1972 | Harding et al. | 264/176 F |
| 3,834,547 | 9/1974 | Renjilian | 210/497.1 |

Primary Examiner—David Klein
Assistant Examiner—Michael W. Ball

[57] ABSTRACT

A process is provided for the continuous production of modular tubular filter elements using nonwoven webs in cylindrical or sheet form spun from thermoplastic fibers, spinning the fibers continuously from a melt onto a rotating internal tubular core for the filter element, serving as a mandrel, and winding them up on the core to form a wound tube.

8 Claims, 16 Drawing Figures

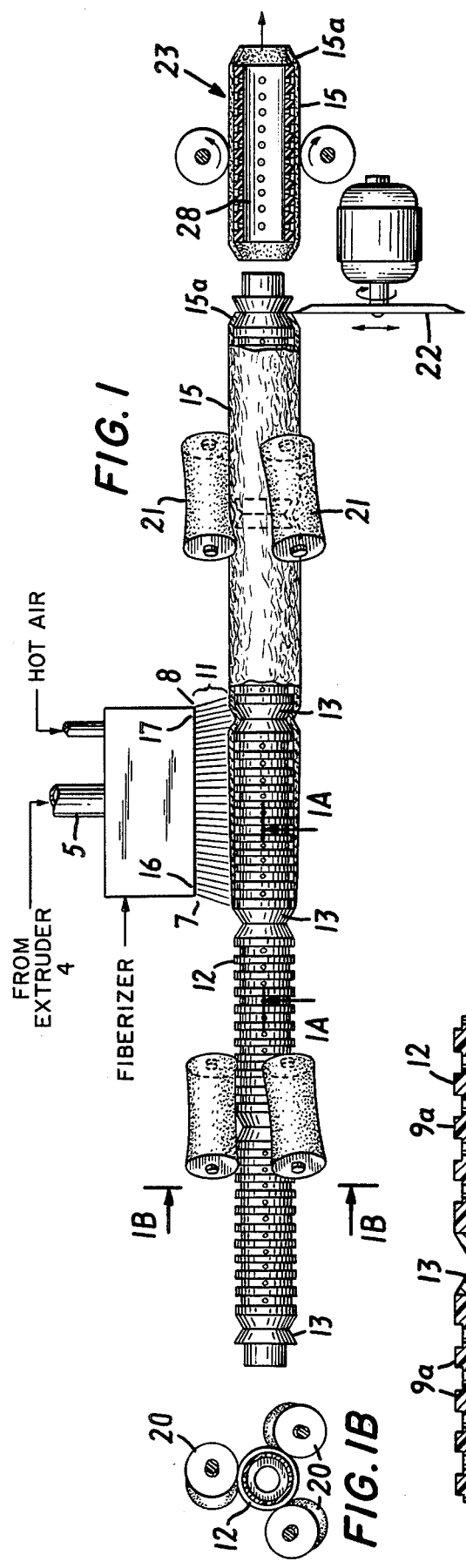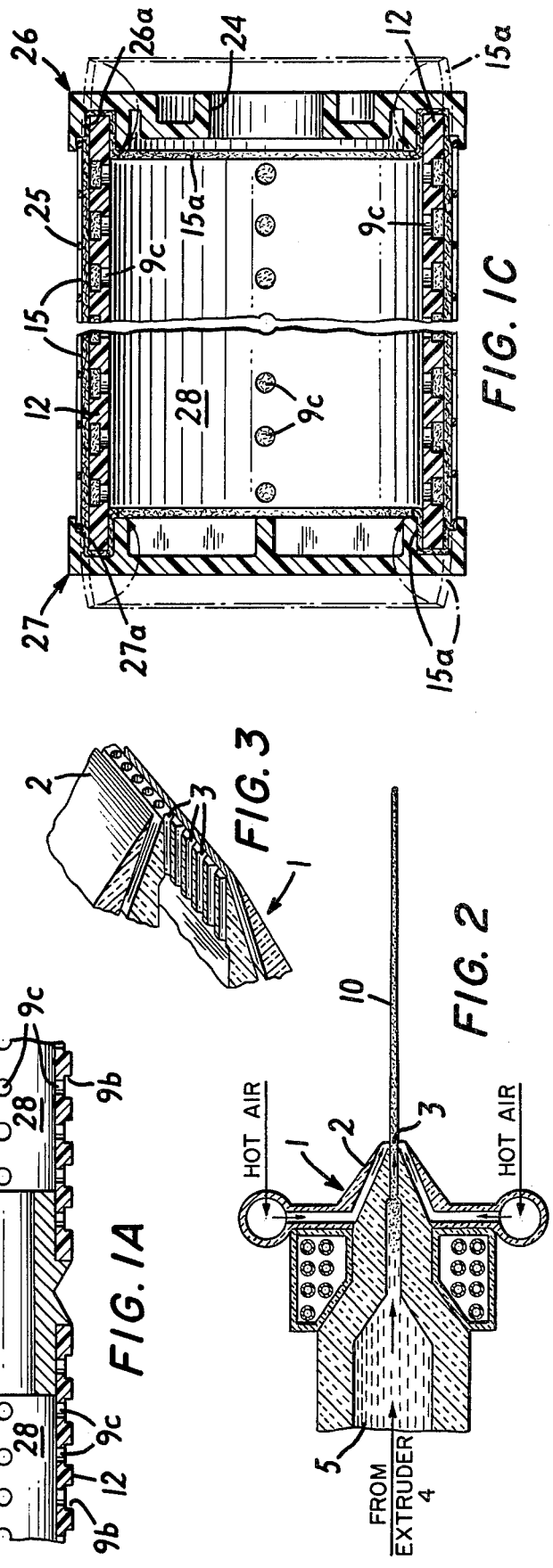

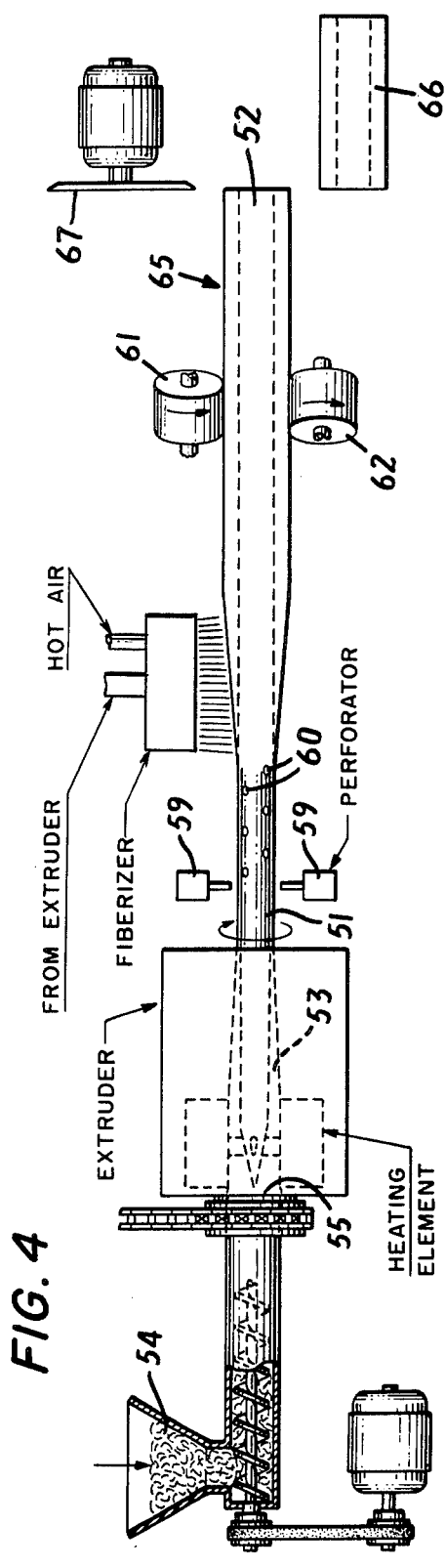
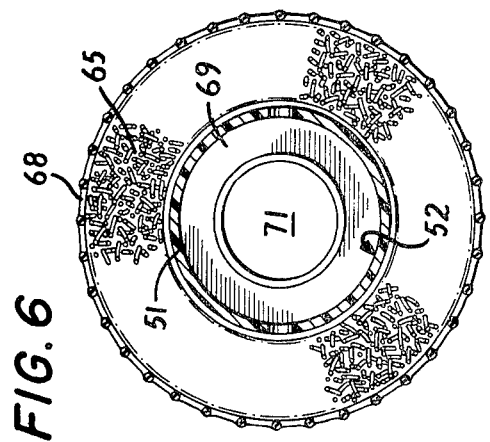
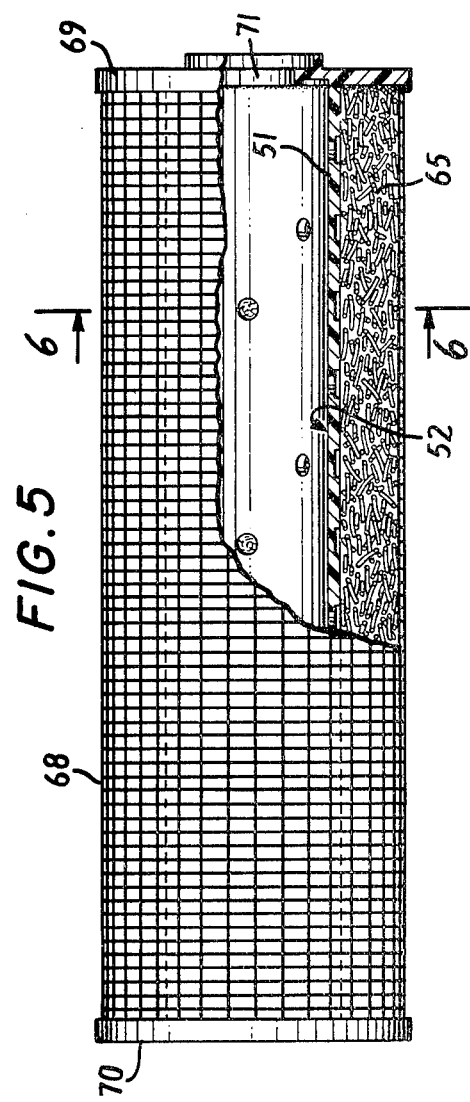

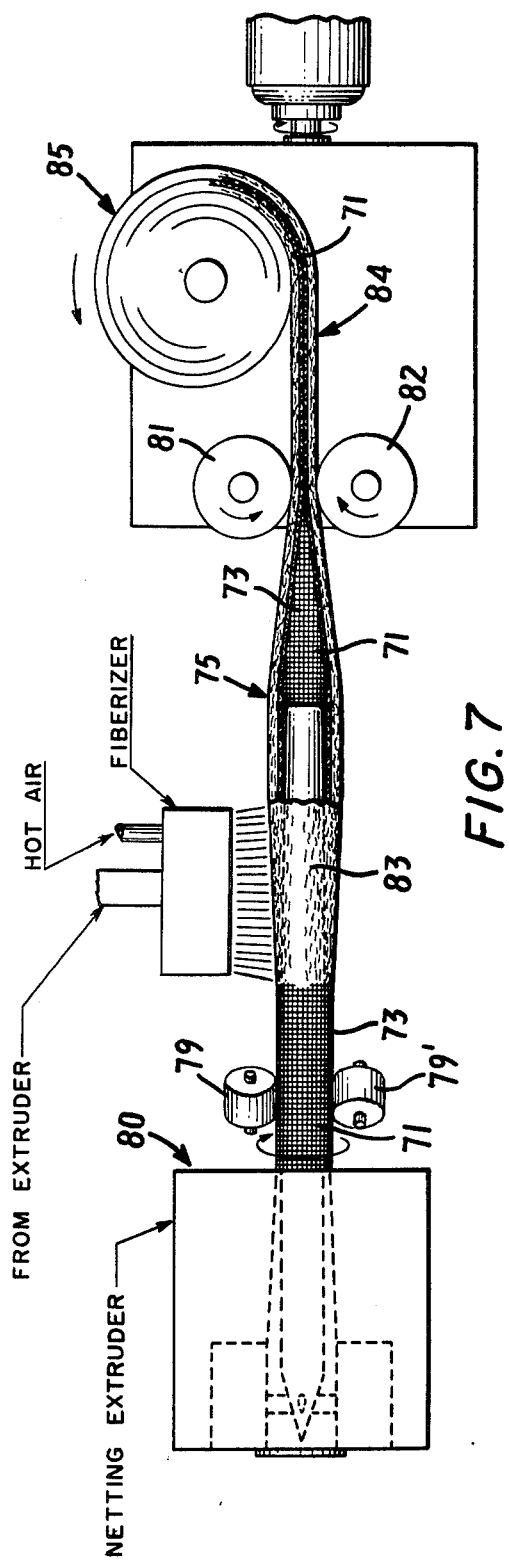
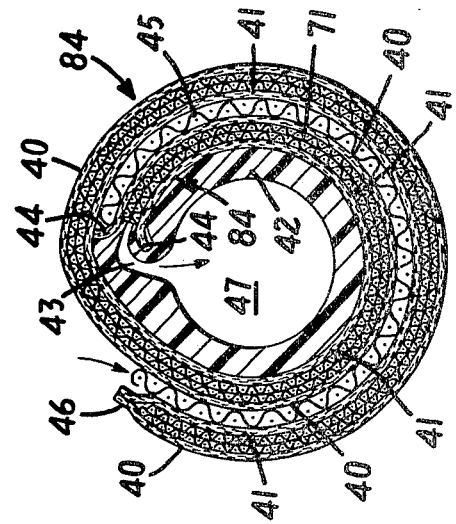
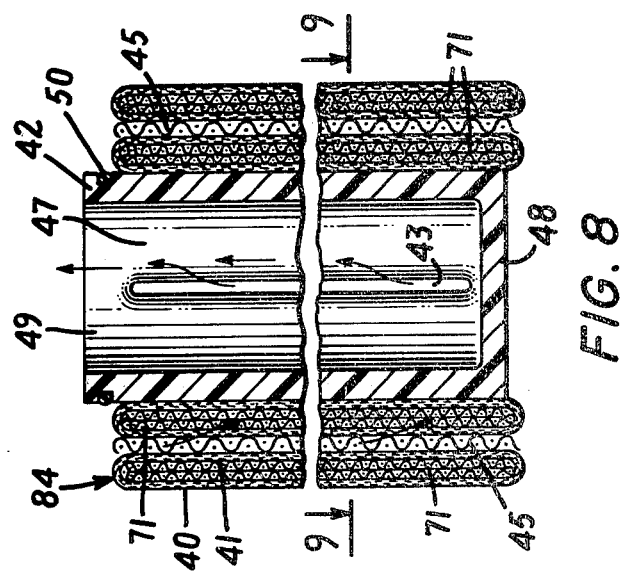

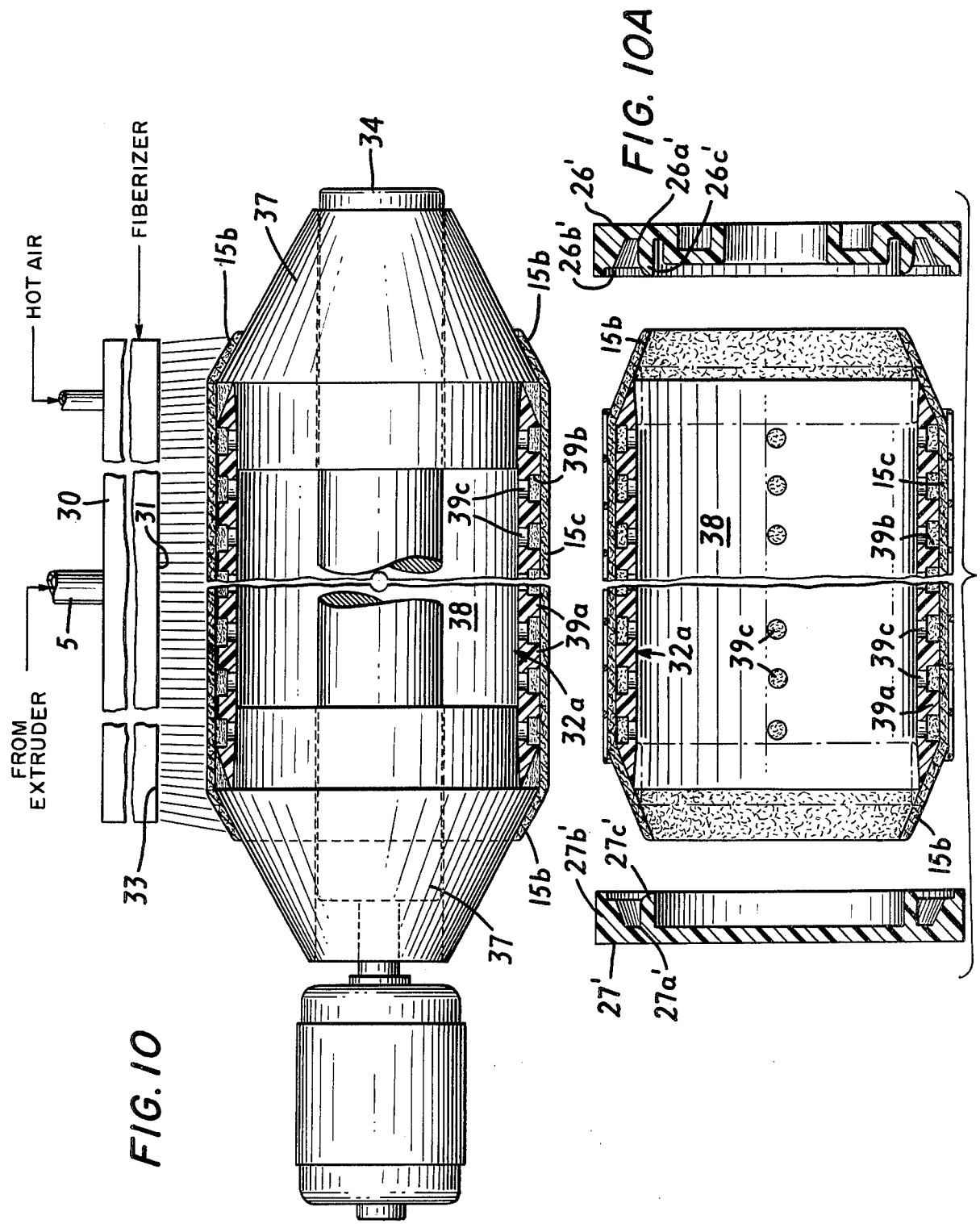

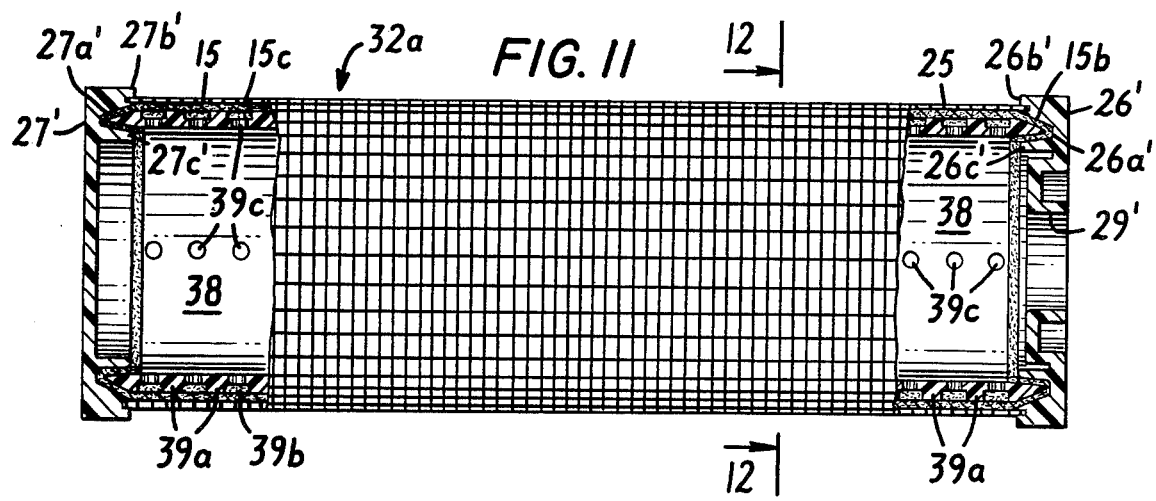
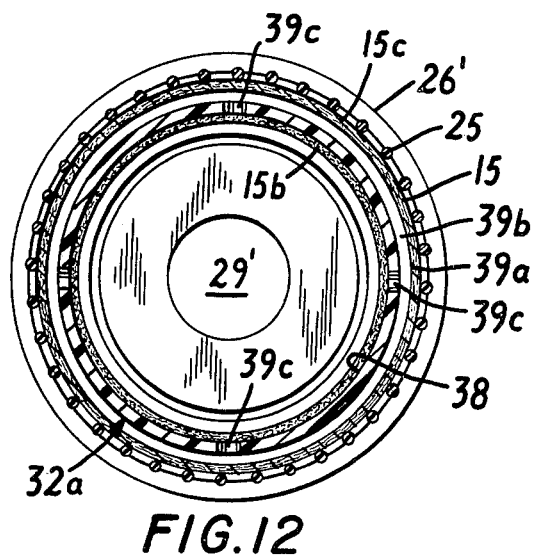

CONTINUOUS PRODUCTION OF TUBULAR MODULAR FILTER ELEMENTS USING NONWOVEN WEBS FROM THERMOPLASTIC FIBERS AND PRODUCTS

This application is a continuation-in-part of Ser. No. 393,688 filed Aug. 31, 1973, now U.S. Pat. No. 3,933,557 patented Jan. 20, 1976.

Cylindrical filter elements are normally formed of sheet material that is folded over onto itself into a cylindrical configuration, with the lapped edges brought together and sealed in a side seam seal. The sheet can be folded with corrugations to increase the useful area of the filter sheet within a confined space. In forming the seam, usually the two outside surfaces of the ends of the sheet are brought together. One or both of the opposed surfaces is coated with adhesive, and the seal is then formed by application of heat to set the adhesive. A seam is formed in which a layer of adhesive extends from end to end of the seam, and across the seam from the outer surface to the inner surface, and this layer of adhesive is presented endwise to the surface of the filter element. The portion of the filter element bonded to an adhesive layer in the seam is of course not porous, and this reduces the available surface area of the filter.

Various types of sealing techniques and folding of the side edges of the filter sheets at the seal have been proposed, to avoid these problems, but none have been fully successful. Canadian Pat. No. 742,053, issued Sept. 6, 1966 to David B. Pall and Herbert L. Foreman, describes a reversed lapped seam side seal, wherein the outer surfaces of the adjacent sheet portions are brought together in face-to-face relationship with a self-sustaining ribbon of bonding agent therebetween bonding the sheet portions together to form a leak-proof seal. However, in this type of seam also, the bonding agent presents an area of nonporous material extending from the inner surface to the outer surface of the filter sheet.

In the manufacture of cylindrical filter elements with ultrafine removal ratings, it is frequently advantageous to use a very thin filter sheet, since a thin sheet presents less resistance to fluid flow than a thick one. Such sheets tend to be fragile, and it is for this reason desirable to reinforce the thin sheet against rupture due to applied pressure in both directions, and against mechanical damage by handling during and after fabrication, by surrounding it with relatively thicker and stronger layers of more open foraminous sheet materials. The resulting multilayer structures with generally tapered or stepped pores are particularly difficult to seal together in a cylindrical form, because an adhesive of sufficiently low viscosity to penetrate the coarse layers tends to be rapidly drawn away by the finer capillarlty of the finer layers, with the result that the coarser layers are starved of adhesive, and imperfectly sealed together. For this reason, such seals tend to be very unreliable, and permit passage of solids through the filter elements by edgewise flow through the interposed coarser layers at the seal.

A further difficulty with side-seam-sealed cylindrical filter elements is the bonding of end caps to the open ends of the cylinder. The adhesive systems used to bond the end caps to the ends of the side-sealed pack usually adhere very well to the filter media layers, since these are porous and consequently absorb some of the adhesive, forming a good bond. The same is not true with respect to the layer of adhesive holding the side seam seal together. In many systems, there is zero adhesion between the adhesive system of the end cap and the adhesive in the side seam seal. Consequently, it frequently happens that a poor seal is formed at the adhesive layer, with the result that a leakage path can be formed under fluid pressure across the filter element. Since the adhesive extends from the outer surface to the inner surface of the filter sheet across the seam, the result is a potential bypass route for fluid which does not pass through the filter.

A potential leakage path of this sort cannot be tolerated in cylindrical filter elements in which the filter sheet is of a porous size such that the filter can be used in filtering out harmful microorganisms such as yeasts or bacteria. The development of such a leakage path in use under high fluid pressure will result in the organisms bypassing the filter, with possibly disastrous consequences.

It is quite difficult in cylindrical filter elements formed of sheet materials to provide a filter cartridge having a sufficient thickness to provide in-depth filtration, a characteristic that is particularly desirable in filtering some kinds of contaminants from fluids. Generally speaking, the longer and the more devious the path that a fluid must follow in passing through a filter, the better the chances of removing any suspended material which is small enough to enter the filter pores. The reason is that such material although capable of passing through the pores tends to become lodged in crevices, nooks and crannies along the pores. The longer and more tortuous the pore, the more nooks, crevices and crannies along its length, and therefore the higher the removal rating for such particles.

Nonwoven fibrous mats and bats are preferred indepth filter materials, but these materials do not lend themselves to the formation of cylindrical filter elements capable of resisting high differential pressures, because of the low tensile strength of such materials. It is especially difficult to bond the edges of a sheet of nonwoven fibrous material together in a side seam seal. Accordingly, such materials are usually used in cylindrical filter elements only in conjunction with backup filter sheets of the conventional type, which can be bonded together in a side seam seal to prevent the passage of particles that happen to penetrate through the indepth filter mat or bat. If back flow is possible, such mats also require an external support, so that the mat is in effect confined between concentric materials, of which either or both can be a filter sheet. The requirement for a backup filter increases the cost of such elements, as well as making it more difficult to bond together the several layers to the end caps in a leak-tight seal.

It is also difficult to control the density and porosity of nonwoven fibrous mats and bats. The size of the pores between the fibers is of course dependent upon the spacing of the fibers from each other, which in turn is controlled by the density or the degree of compression of the layer. If the layer be confined between two rigid surfaces, it is possible of course to compress the layer, and to thereby obtain some control over the density, but it is not easy in this way to achieve uniform porosity control from filter element to filter element.

Cylindrical filter elements have also been formed by winding fiber or yarn in opposed spiral or helical laps about a mandrel, to form what is known in the trade as a "wound" or "honeycomb" element. The expression "honeycomb" is used because filters so made are characterized by alternating low or open areas at the interstices between the fibers and high density fibrous or closed areas, where the fibers overlap and cross, extending through the thickness of the element. For this reason such filters tend to be inefficient, since the open areas pass large particles and tend to unload collected solids during periods of varying flow, while the denser areas have lower permeability and therefore see less flow of the fluid filtered. The fibers or yarn used for such elements is spun from relatively coarse fibers, no commercially used cartridge having fibers less than about 12 $\mu$m diameter, while most are in the 20 $\mu$m or larger range. The fibers in the yarn are parallel or nearly parallel to each other, which represents a very inefficient orientation for filtration purposes.

Still another configuration in which commercially available filter elements are made is accomplished by winding a preformed non woven sheet or web of resin-bonded spun glass fibers around a perforate mandrel into the form of a cylinder. U.S. Pat. No. 3,268,442 to David B. Pall, Sidney Krakauer, Chesterfield Franklin Siebert, Marcel G. Verrando and Cryil A. Keedwell, patented Aug. 23, 1966 proposed to control the density of nonwoven bats by winding up the bat to form a spirally wound cylinder with two or more layers of differing density and diameter, using fibers of different sizes in the spirals. Such elements can have graded density, but they suffer from the necessity of adding a substantial proportion of resinous binder to anchor the glass fibers, and in fact some "media migration" (release of fiber downstream) occurs even when resin binder is used, due in part to the brittle nature of the glass fiber. The use of a resin binder limits the usefulness of the elements, since the resins used for this purpose are attacked by various reagents.

In all of the techniques used previously to form cylindrical filter cartridges, sheet material is used as the starting material, and the dimensions of the cartridge are accordingly circumscribed by the dimensions of the starting sheet. If a filter cartridge of high flow capacity and surface area is required, it is very difficult to achieve it by increasing the size of the filter. One cannot merely increase the length of the cartridge, because of the difficulty of finding sheet material of such a length, and of forming long sheets into cartridges. Consequently, the art has resorted to the use of filter cartridges of relatively standardized lengths, butting cartridges together, end to end, and sealing them together at their ends to form a filter cartridge of a longer-than-standard length. Butting cartridges together is a satisfactory resolution of the difficulty in some respects, but the joints afford additional leakage paths, which can be a source of trouble in operation of the composite.

U.S. Pat. No. 3,801,400 to Vogt, Soehngen and Polise, patented Apr. 2, 1974, describes a process in which polypropylene or other fiberforming polymer is melt extruded as a continuous molten stream which is attenuated by a plurality of gaseous streams into a fine filament and projected onto a rotating collection surface, such as a mandrel. During collection there is changed, one or more times, at least one of (i) temperature of the filament-forming material, (ii) the speed of extrusion, (iii) the speed of rotation of said collector, (iv) the distance between extruder and collector, or (v) the weight of an idler roll on the collector, thereby to form an annular layer whose density differs relatively from the layer immediately preceding it.

The resulting cylindrical, self-bonded, nonwoven structure is withdrawn from the mandrel, and is sufficiently rigid to be self-supporting after withdrawal. The cylinder may be cut to a suitable lenth, and has a predetermined density profile. For uses such as filtration, the fluid to be filtered enters from the low density side so that solids will deposit throughout the filter more or less uniformly rather than building up so much in the first-contacted layer that it becomes fully clogged before the balance has had any appreciable solids build-up.

The process results in a rigid cylinder, composed of continuous filaments or staple fibers which are wound on the mandrel without disruption or breakage, and have diameters within the range of 0.5 to 50 microns. The density of the cartridge in any given part is less than 50% of the density of the polymer substrate, and is lower at the outer stratum than at the inner, or vice versa, or varies from stratum to stratum, and the diameter of the fibers also varies, presumably due to the varying degrees of attenuation and processing conditions.

When the plastic fibers are spun from a spinning die such as described in *Naval Research Laboratory Report No. 111,437*, dated Apr. 15, 1974, entitled "Manufacture of Superfine Organic Fibers", or as described in U.S. Pat. No. 3,825,380, and attenuated from the spinning die using high velocity air jets, very fine fibers of average diameter in the range from about six microns down to as low as one-half to one micron, are obtained. When a die of this type is constructed with a continuous array of spinning orifices several inches to several feet long, and the fibers are collected on a foraminous moving belt, the turbulence of the air jets causes the fibers to become intertwined in a very uniform manner, to the extent that a web is formed which is quite strong enough to function well as filters, clothing interliners, wipers, etc. The small diameter of the fibers and the uniformity of their orientation endows the resulting webs with excellent filtration characteristics, very good thermal insulation characteristics, and excellent absorbency for liquids when used as wipers (provided that the plastic used is wetted by the liquid, or is treated so as to be wetted), and similar applications.

Irrespective of the length of the die used, it is a characteristic of this type of die that it is prone to local clogging, probably due to passage of resin gels through the barrier screen provided, and clogging of the fine orifices by these gels. When such local clogging occurs, the product web made by use of a conventional endless belt contains continuous longitudinal areas which are lower in weight per unit area, thinner, weaker and poorer in filtration efficiency, than the remaining portions of the web. Even though the reduction in total resin throughout is small, for example 1%, the die must then be removed, disassembled, and cleaned, a very costly process in terms of labor and lost production time.

Problems due to clogging are substantially alleviated by the process of this invention, in which the web is collected on a rotating mandrel, and continuously withdrawn from the mandrel as a flattened flexible tube. By rotating the mandrel rapidly with respect to the rate of withdrawl, for example such that the pitch of the spiral through which an element of the web travels during manufacture is less than about ¼ to ½ inch, a uniform web is obtained even though a portion of the die is nonoperative; thus production can continue until such time as the proportion of the die which is nonfunctional becomes excessive — e.g. 10% to 30% or more.

In accordance with the invention, a process is provided for forming modular filter elements using nonwoven thermoplastic fibrous material in a seamless cylindrical configuration and in modular or continuous lengths, by winding fibers as they are melt-spun from a spinning die directly onto a rotating tubular internal core for the filter element, serving as a mandrel, and as the permanent internal support for the filter element, and in continuous or modular fibrous cylinder lengths, according to the core length. Such a seamless cylinder can be made in any thickness and length desired of any thermoplastic polymeric fiber-forming material. Control of the density of the wound cartridge during lay down controls the porosity of the cylinder that is obtained. The cartridge does not require end caps if projecting end portions are provided that can be folded over on the core at either or both ends. The folded-over portions serve as sealing means to the housing into which the filter is assembled.

A particular advantage of this method is that it makes possible the laydown of very fine fibers, which are preferred for filter elements having fine pores and a high proportion of open area. Such fine fibers tend to form webs which are so weak as to be impractical to manipulate, but fabrication directly on the core avoids this problem. Fibers that are less than $10\mu$ and can range below $0.5\mu$ down to $0.1\mu$ can be spun and laid down onto the rotating tubular core.

Accordingly, the process of the invention comprises spinning molten thermoplastic material in the form of a plurality of fibers and collecting and winding the fibers directly on a rotating tubular core for the filter element, to form thereon a wound layer of randomly oriented heterogeneously intertwined spun fibers of the desired depth and density, which constitutes the porous filtering structure of the filter element. In one particular form of the invention, molten thermoplastic resin is spun by a multiorifice die.

As a further feature of the invention, application of a gas blast at the orifices of the spinning die directed generally in the direction of projection of the fibers from the orifices attenuates and disrupts the fibers before or during laydown on the tubular core into discrete lengths. However, any known alternative technique can be used, such as mechanical drawing down or stretching of the soft fibers while they are still plastic.

Another and important feature of the invention is the laydown of the fibers on a tubular core that is preformed in selected modular lengths. Such cores can be covered with a layer of fibers in an intermittent or batch operation, singly or in an array, or in a continuous operation in which the cores are arranged end to end and the array continuously advanced during laydown. In such an array, the core ends can be shaped to interlock, for rotation in unison during laydown. The cores also can be formed in situ, just prior to laydown. In all cases, selected modular lengths of tubular filter elements are obtained.

If the cores are pre-formed, and placed end-to-end, the core lengths can be separated following laydown by cutting through the fibrous layer. The ends can then be provided with end caps. The fibrous layer is preferably so cut as to extend beyond the core. If there is a projecting end portion, the resulting tubular filter element can be inserted in a filter assembly and sealed therein at its ends, since no end cap is needed; the folded-over-end portions serve as a sufficient safe-guard against leakage of unfiltered fluid, since leaking through the folded-over portions is of course filtered.

Alternatively, if desired, the folded-over portions at one or each end can be attached to end caps by bonding, or in a press-fit, to ensure a leak-tight seal.

To obtain projecting end portions in each length, the core sections can be separated by spacers which have a length twice the length of the extension desired, and the filter element lengths are then cut off at a point midway of the spacer length.

If the core is formed in situ, continuous endless lengths are obtained, which can be cut off at any selected unit length.

Control of density of the resulting cylinder can be obtained by spacing the orifices of the spinning die at different distances from the rotating core, and attenuating the fibers before laydown on the core. A spinning die of course has a plurality of such orifices. If the face of the spinning die bearing the orifices is arranged at an angle to the core, some orifices will be at a greater distance from the core than others. The result is that some fibers travel over a greater distance than others, before they are collected on the core. The shorter the distance the fibers travel between the orifice and the core, the greater the density of the layer collected therefrom. Consequently, by arranging to lay down first the fibers from those orifices closest to the core, a greater density is obtained in the portion of the layer that is closest to the core than in the portion where the fibers come from orifices at a greater distance from the core. Alternatively, the fibers from orifices at the greatest distance from the core can be laid down first. It is possible in this manner to lay dow a cylinder having a greater or lesser density at the center, gradually or abruptly decreasing or increasing towards the outer surface of the cylinder.

The process affords an unlimited flexibility in the dimensions and number of orifices as well as the spacing of the orifices in the spinning die. Large size continuous dies are difficult to construct, and certain size limitations cannot be practically exceeded, but in the process of this invention there is no limit on the number and location of the spinning dies. Because each element of the simultaneously rotating and axially translating core is impinged upon equally by every part of each die used, regardless of its location, the dies can be arranged about the core in any spacing and orientation, to provide for a laydown of any desired number of fibers per unit interval. Multiple narrow dies which are easier and less costly to construct can be used, in a number to provide for fabrication of the filter elements at any desired size and rate of production.

Use of multiple spinning dies makes it possible to lay down different fibers in a predetermined sequence, so as to lay down fibers of different softening point, and then further bond them together, or to bond the web to other web or webs by softening the lower softening point fibers, or fibers of different solvent susceptibility, so as to render the surface of one kind tacky by solvent, but not the other, or fibers of different tensile strength, so as to strengthen the cylinder, or fibers of differing diameter, and so on.

The fiberizing processes can be adjusted to make very fine fibers, for example under 1 to 1.5 microns in diameter, but these tend to be quite short, as a result of which the web so formed is quite weak. By using multiple modular dies, the fine fibers can be laid upon a strong relatively coarse (e.g. 2 to 5 microns) base, and if desired covered again by a strong coarse fiber web.

The finished cylinder of nonwoven fibrous sheet material can be cut off in lengths according to the core length and the length of filter elements desired, and this can be done continuously as the fibers are being spun, so that the filter cylinder is continuously formed at one end and continuously withdrawn at the other end, while the core is rotating. If the core lengths are preformed, it is only necessary to cut through the layer of fibrous sheet material on the core. The core can itself be supported on a mandrel extending at least over the fiber laydown zone, and then withdrawn therefrom after the filter element length is cut off.

It is not necessary to apply a bonding agent or adhesive to hold the fibers in the resulting nonwoven fibrous web together. The fibers become thoroughly entangled during laydown on the core, and are maintained in juxtaposition in the web by virtue of this entanglement. If the fibers are soft and adherent at the time they strike the core, they may become bonded together at their crossing points in the course of windup on the core. The process can however be controlled so that the fibers while molten at the time they emerge from the orifices of the spinning die harden, become solidified, and are non tacky at the time they reach the core and are wound up. Such fibers have their dimensions fixed at the time the cartridge is formed and better control of the size of the pores is therefore obtained, since the fibers have little or no tendency to become distorted in a random manner during windup.

The seamless cylinder that is obtained can be treated in any desired manner, and then is cut into selected lengths, if the core and fibrous layer are relatively rigid, and retain their cylindrical shape. The lengths can then be formed into filter cartridges with or without the application of external supports and end caps, using conventional techniques. Non rigid cylinders can be provided with internal or external supports, or may be flattened and wound up spirally, or opened out and used as bags with flow from inside to out, with one or both ends open.

Thus, the invention provides a seamless filter element which can be in cylindrical or sheet form, or indeed any other configuration obtainable by shaping these two basic forms, comprising a layer of randomly oriented heterogeneously intertwined spun fibers less than $10\mu$ and preferably less than $5\mu$ in diameter, of any desired depth and density, and having a voids volume of at least 70% and preferably at least 85%, wound on a permanent core.

Preferred embodiments of the process and products of the invention are shown in the flow sheets of the drawings, in which:

FIG. 1 represents an embodiment of the process of the invention for producing cylindrical filter elements upon a rotating array of interlocked modular preformed tubular core lengths, cutting through the fibrous layer to form filter element sections and applying end caps to each end of each length;

FIG. 1A is a detail view on an enlarged scale of a two-core-and-spacer assembly of portion 1A in FIG. 1;

FIG. 1B is a cross-sectional view taken along the line 1B—1B of FIG. 1;

FIG. 1C is a detailed view of the filter cylinder prepared in the process shown in FIG. 1 with end caps applied to cap off the ends of the cylinder;

FIG. 2 shows in longitudinal section one orifice of the spinning die of FIG. 1, having an array of orifices embraced by nozzles for directing a gaseous blast for attenuating and disrupting the molten filaments spun through the orifices;

FIG. 3 shows in perspective the spinning die of FIG. 2;

FIG. 4 represents another process embodiment in which the cylindrical fibrous layer is laid down on a tubular foraminous core which is also continuously extruded through a die and itself serves as a permanent core for the resulting filter elements, which is accordingly cut off in lengths of filter element and completed simply by applying end caps;

FIG. 5 represents a longitudinal section through a filter element obtained by the process of FIG. 4;

FIG. 6 represents a cross-sectional view taken along the line 6—6 of FIG. 4;

FIG. 7 represents a third embodiment in which a cylindrical fibrous layer is laid down on a tubular foraminous core that is pre-formed by an extrusion or other forming process and itself serves as a permanent core for the resulting filter element;

FIG. 8 represents in longitudinal section a flattened spirally wound filter element prepared by the process of FIG. 7, made into a filter cartridge supported on an internal core;

FIG. 9 represents a cross-sectional view taken along the line 9—9 of the filter cartridge shown in FIG. 8;

FIG. 10 represents a fourth embodiment in which a cylindrical fibrous layer is laid down on a tubular foraminous core that is preformed, one cylinder at a time, in an intermittent or batch operation, with a lap on the ends of the resulting filter cylinder;

FIG. 10A is a further view showing how to apply end caps to the ends of the filter cylinder without a bonding or sealing agent and still obtain a leak-tight seal;

FIG. 11 represents in longitudinal section a cylinder obtained by the process of FIG. 10, made into a filter cartridge enclosed by end caps and supported on the internal core on which the fibrous layer is laid down; and FIG. 12 represents a cross-sectional view taken along the line 12—12 of the filter cartridge of FIG. 11.

The process of the invention is applicable to any thermoplastic resinous material that can be spun through the orifices of a spinning die or spinnerette to form a fibrous web. Exemplary thermoplastic resinous materials include polyamides, polyacrylonitrile, linear polyesters such as esters of ethylene glycol and terephthalic acid, and of 1,4-butane diol and dimethyl terephthalic acid or terephthalic acid, polyvinylidene chloride, polyvinyl butyral, polyvinyl acetate, polystyrene, linear polyurethane resins, polypropylene, polyethylene, polysulfone, polymethylpentene, polycarbonate, and polyisobutylene. Also within this category are thermoplastic cellulose derivatives, such as cellulose acetate, cellulose propionate, cellulose acetate-propionate, cellulose acetate-butyrate and cellulose butyrate. Non-resinous materials such as glass can be similarly processed.

The process utilizes fine fibers. Coarse fibers have diameters from $10\mu$ to 50 or $100\mu$ or higher. Fine fibers have diameters below $6\mu$ and preferably below $4\mu$, down to $0.5\mu$ or less. Fine filaments give a flexible nonwoven web having a finer pore size, and a soft hand, while coarse filaments generally give a less flexible nonwoven web having a larger pore size and a harsh hand. Fine filaments have better thermal insulation characteristics, and a soft hand even when relatively thick, and are therefore useful as clothing interliners and for other thermal insulation applications.

Any conventional spinning die or spinnerette can be used. Such dies are available and well known in the fiber-spinning art, and form no part of the instant invention. The term "spinning die" will be understood to include spinning nozzles; spinnerettes; reservoirs faced with a plate including a plurality of orifices in any desired size and pattern; and centrifuges or rotors having a plurality of orifices about their periphery, through which the fibers are spun by centrifugal force. Fiberizers, rotating wheels and discs, and like materials are also included.

A preferred type of spinning die has openings arranged circumferentially about the individual orifices, or array thereof, adapted to discharge a gas at high but controlled velocity along the central axis of the orifice. The gaseous blast attenuates the fibers, and tends to disrupt them so that they are broken up into discrete lengths, which can be adjusted according to the velocity and volume of the gaseous blast. If a centrifugal rotor is used, the openings for discharge of the gaseous blast can annularly surround the rotor. If a plurality of spinning orifices or nozzles are used, the blast can be emitted from jets arranged about the circumference of the individual jets or nozzles. In the case of a spinning die with a plurality of orifices in a plate, the blast can be emitted at the periphery of the spinning die. A typical arrangement is shown in FIGS. 2 and 3, where a spinning nozzle is illustrated.

The gaseous blast can be heated, so as to retard the cooling of the fibers. The gaseous blast can also be a cold blast, to accelerate the cooling of the fibers, and thereby their rate of solidification. Thus, by the use of the gaseous blast the time interval during which the fibers harden and solidify can be controlled. If the fibers are kept hot longer, the attenuation is increased, and if the fibers are cooled more rapidly, the attenuation is decreased. Thus, in this way some control over the length of the fibers is also obtained.

The polymeric material of which the fibers are spun is maintained in molten condition at the time of spinning. The temperature of the melt is adjusted to obtain a molten material of the desired viscosity at the time the material emerges from the orifice. This also gives some control over the degree of attenuation and the lengths of the fibers, since a more viscous material tends to be more cohesive and less attenuated by the gaseous blast and since it is generally at a lower temperature, will also cool more quickly and therefore solidify in a shorter time, yielding a relatively larger diameter fiber.

The distance between the orifices of the spinning die from the rotating core is controlled so that by the time the fibers reach the core they have cooled sufficiently so as to be shape-retaining. They may still be soft, and therefore adhesive, so that they tend to stick together at their crossing points. They may also be fully solidified, so that they do not adhere to one another, in which condition they retain their shape better. They are collected in a randomly oriented heterogeneous intertwined arrangement on the core, since virtually no control is exercised over the path the fibers follow in their trajectory from the spinning die to the core. By the time the fibers reach the core, they are either already broken up or disrupted into discontinuous lengths, or they are still attached to the orifice from which they are spun by a portion which is molten. In the latter case, the fiber is continuous.

The attenuating air issues at just below sonic velocity, which is very much greater than the peripheral velocity of the collecting surface or core; hence there is very little attenuation of the fibers by the rotating motion of the core. Mechanical attenuation cannot in fact produce the fine fibers of the invention, and is not employed in the process of the invention.

The fibrous material collected on a rotating core or tube tends to be laminar in form, the material collected during each successive rotation forming a single lap or later. If the distance from the die to the core or tube collecting surface is small, 3 inches to about 6 inches, the fibers in the adjacent layers become firmly entangled, such that it becomes difficult or impossible to distinguish or separate the layers. If the die-to-collecting-surface distance is relatively large, 12 inches to 18 inches, the layers can be separated from each other but adhesion is sufficient to permit the product to be very useful in many filtration applications. The thickness of each layer in the lapped web obtained depends upon the rate of the rotation of the core, which from a practical point of view is not critical between wide ranges. As a rule, it is desirable for the core to rotate at a rate such that each portion of the collected tubular web contains ten to twenty or more layers, but webs with only one or two layers can be made.

If the distance from the orifices of the spinning die to the tubular collecting surface is relatively large, and the spacing of the orifices relatively coarse, there may be "roping" (intertwining or spiral twisting of filaments to produce a heavy yarn or rope) of the filaments from adjacent orifices before laydown. Some "roping" can be tolerated without a materially harmful change in the characteristics of the tube. As "roping" increases, however, the tube begins to acquire the characteristics of a "honeycomb" tube, which may be undesirable.

In general, at a distance of from 3 to 4 inches, there is no "roping," while at a distance above 12 inches "roping" becomes severe. Over the intervening distances, from 4 inches to 12 inches, "roping" appears and becomes increasingly severe. The distance can thus be adjusted as required to avoid or control the amount of "roping."

For liquids filtration, uniformity of laydown is important, and the distance is thus preferably from 3 to 5 inches. For gas filtration, it is desirable to obtain high voids volume in order to reduce pressure drop across the nonwoven web, and the distance is thus preferably from 7 to 10 inches to obtain a lower density laydown with a small proportion of "roped" filaments.

Another way of controlling "roping" is to increase the spacing of the orifices of the spinning die. In a conventional spinning die, the orifices are rather close together, and a spacing of 20 to 50 orifices per linear inch is standard. This spacing gives severe "roping" at distances over 12 inches.

On the other hand, an increase of the spacing to from ten orifices per linear inch down to one orifice per linear inch virtually precludes, if it does not eliminate, "roping." While this increases the size and length of the spinning die or dies, and would result in striations in the machine direction in the conventional system, this is perfectly acceptable in the process of the invention.

By placing the spinning die or die combination so that all orifices thereof are at the same distance from the outer periphery of the rotating core, i.e., the collecting surface and attenuating the fibers before laydown, using a gaseous blast or other attenuating means, it is possible to obtain a uniform density of the mat or web on the core. The distance between the orifice and the collecting surface determines the density of the mat; the shorter the distance, the higher the mat density. Accordingly, by varying the distance, but keeping the spinning die parallel to the collecting surface, in the manner shown in the FIGS., the density in the resulting mat is easily controlled.

Cylindrical webs or tubes can be formed in a continuous manner.

The intermittent system is used with a core that is pre-formed and pre-cut in selected lengths. The core is rotated in the stream of fiber effluent from the fiberizing die until a cylinder of the desired thickness is built up. The cylinder so formed then is removed from the stream of fibers with the core. A new cylinder is then built up on the core or its replacement.

The tube which is so formed may then have its end trimmed. At this point, if thick enough to be self-supporting, it forms a usable filter element. If the tube is relatively thin-walled, it will still function as a finished element if it is provided before or after forming with a foraminous internal core or external support.

The continuous mode of operation with either an array of pre-formed cores or when the core is formed just prior to laydown as by extrusion. The cylinder formed on the core is continuously withdrawn from the rotating support. In this manner, cylinders of any desired length can be made.

Thickness of the web laid down on the core is adjusted in the intermittent mode of operation by the rate of rotation and the diameter of the core, the rate at which the fibers are extruded, the density of the collected fibrous structure, and the time allowed for laydown. In the continuous mode, thickness is adjusted by the rate of rotation and the diameter of the core, the rate at which the fibers are extruded, the density of the collected fibrous structure, and the rate at which the cylinder is withdrawn from the laydown zone.

The rotating core on which the mat is laid down can be rotated in a fixed position, in which event the finished cylinder is drawn off the end of the rotating support, using for example a pair of drawing rolls, in the manner shown in FIG. 1, or rolled up in a flattened state as shown in FIG. 7. To facilitate slipping off of the cartridge from the support, the support can be tapered so as to diminish the diameter towards the end at which the cartridge is drawn off.

When making relatively thicker wall tubes, for example, with wall thickness in excess of ¼ inch to ½ inch, the fibers may become softened due to the extended exposure to the impinging flow of hot gas. This is particularly the case where the die to collecting surface distance is small, for example, less than 4 inches to 7 inches. In order to avoid the consequent densification and shrinkage, it is often desirable to introduce cooling, which can be accomplished by various means, for example by internally cooling the collecting surface, as by flowing cold water through it, or by cooling the fibrous mass by blowing cold or room temperature air at and through it from the side opposite the die, or by blowing cold air through the foraminous core.

The completed cylinder can be further processed in various ways. It can for example be impregnated with a resin binder or impregnant to obtain a more rigid structure, or to reduce porosity. Additives can also be added thereto. For instance, if the cartridge is to be used for water treatment purposes, it can be impregnated with a bactericide, or fungicide, or other water-treating material which is to be dissolved in the water passed through it.

Additives can also be incorporated by feeding them into the stream of fibers from the spinning die orifices before laydown. Such additives can include activated carbon, diatomaceous earth, glass or other organic or inorganic fibers, surface-active agents, fillers such as silicone resins, polytetrafluoroethylene, hydrophobic silica, and similar agents, and binder resins in liquid droplets or solid form.

The cylinder can be cut into lengths, and processed further to form a cylindrical filter element. This may include the application of internal core and external sheath supports, and end caps to each open end of the cylinder, and attaching the end caps to the cylinder, core and sheath with or without adhesive. The end caps will be shaped so as to fit within the filter assembly in which the resulting filter element is to be used.

The apparatus shown in FIGS. 1 to 3 includes a spinning die 1 whose face 2 has an array of orifices 3 (see FIGS. 2 and 3). The spinning die is supplied with molten thermoplastic polymeric material such as polypropylene from a reservoir 4 which is fed by the inlet line 5 carrying molten thermoplastic polymeric material from an extruder or other source of supply (not shown) and is further supplied with compressed air or steam under pressure sufficient to project the resin from the orifices of the die, thereby forming a plurality of molten fibers 10.

The fibers traverse a short air space 11, in the course of which they are attenuated and solidify, and are collected on a rotating array of interconnected tubular cores 12, interconnected and rotatably interlocked with spacers 13, the entire array being self-supporting. The array is held between two sets of three canted rollers 20, 21, which are driven by an electric motor (not shown) in unison at the same speed, and rotate the array of cores 12 and spacers 13 at a relatively slow speed, approximately 3 to 5 feet per second, in this instance. The fibers are randomly oriented and heterogeneously intertwined as they are wound up on the core, forming a generally spirally wound layer of nonwoven fibrous material 15, serving as the porous filtering sheet of the resulting filter element.

The spinning die is parallel to the cores 12, so that the orifices at the lower end 7 are the same distance from the cores as the orifices at the upper end 8. Consequently, the portion at 16 of the nonwoven fibrous mat formed of fibers laid down from the orifices at the end 7 has the same density as the portion at 17 of the mat formed of fibers laid down from the orifices at the end 8.

The cylinder 15 as it is being rotated and formed continuously is also drawn continuously to the right by the canted rollers 20, 21. By the time an element of the cylinder has reached the point 17, it has reached its final thickness.

The core unit lengths 12 are pre-formed in selected lengths, and have a plurality of circumferential surface ridges 9a spacing the fibrous layer 15 from the slots 9b defined therebetween and the openings 9c at the base of the slots 9b for flow of liquid to or from the open interior 28 of the cores through the cores to the exterior thereof.

Each core length 12 has an interdigitated end, interconnecting with one end of the spacers 13, and the other end of spacers 13 is interdigitatingly locked to the next adjacent core length 12. This locks the core sections together, so that they rotate in unison, and can also be drawn continuously to the right. Each core section 12 may however be withdrawn axially from the spacer 13 as will now be seen.

The filter cylinder is now ready to be separated, and approaches the cutoff wheel 22, where the fibrous layer 15 is cut through at about midpoint of the spacers 13 leaving a lap 15a extending beyond the core 12 at each end, making it possible to pull off the filter length 23 by withdrawing the core portion from the next following spacer 13.

The resulting cylinder lengths 23 can be used as filter cartridges by enclosing the filter element in an external sheath 25, and then applying end caps 26, 27.

The end caps 26, 27 (shown in detail in FIG. 1C) are provided with narrow circumferential slots 26a, 27a having parallel sides and a width such that when assembled to the end of core section 12, and fibrous web 15 is folded inward, the web is compressed to about ¼ to ¾ of its full thickness. One end cap 26 has central aperture 14; the other end cap 27 is closed. The layer 15 when cut through is longer than the core 12, and the lap 15a is folded over the end of the core 12, and tucked into the open center 28 of the core. The end caps 26, 27 are then applied so that slots 26a, 27a receive the folded portion of lap 15a, compressing the layer 15 to three-fourths or less of its normal thickness there, and making a tight seal without the need for a bonding agent (although one can be used, if desired). The porosity of the compressed portion is less than that elsewhere in layer 15, which is adequate for sealing purposes at the end cap. The filter cartridge is then complete.

In the processing system shown in FIG. 4, the core 51 of the resulting filter element is made of thermoplastic polymeric material, but the material need not be fiber-forming, and is extruded continuously in tubular form with an open central passage 52, in a continuous length, in the same manner as the filter cylinder that is laid down thereon.

The system thus includes a rotatable tubular extrusion die 53 supplied with thermoplastic extrudable polymeric mateial 54 such as polypropylene through the feed inlet 55, from which the continuously rotating rigid tubular core 51 is continuously extruded into a position to receive the fibers 56 spun from the orifices 57 of spinning die 58. Prior to receiving the fibers, the core 51 is perforated or slit by cutting means 59 to provide a plurality of apertures 60 for passage of fluid therethrough into the central open passage 52 of the core.

As an extrudable polymeric material, there can be used not only any of the thermoplastic material used in forming the fibers but also, in addition, materials such as polycarbonates, polyoxymethylene, polytetrafluoroethylene, polychlorotrifluoroethylene, phenol-formaldehyde, ureaformaldehyde, melamine-formaldehyde, epoxy and polyvinyl fluoride polymers.

The fibers 56 are spun onto this mandrel 51 in the same manner as in FIG. 1, and the composite core-plus-filter element 65 formed thereon is drawn forward by the canted rollers 61, 62. Selected lengths 66 of filter element can then be cut off by the cutoff wheels 67. The resulting filter cartridge can be fitted with an external sheath 68 and end caps 69, 70 producing a finished filter element as shown in FIGS. 5 and 6. The end cap 69 has a central opening 71 in fluid flow connection with the central passage 52 of the core 51, while end cap 70 has no aperture. Consequently, fluid entering the central passage 62 must pass through the filter sheet when the filter element is inserted in a filter assembly.

In the processing system shown in FIG. 7, the preformed core 71 of the resulting filter element is extruded in the form of netting, in a diagonal open mesh of thermoplastic polymeric material. Since in manufacture the netting is extruded continuously, it can be in quite long lengths. The netting is in tubular form with a plurality of apertures 73 for passage of fluid therethrough into the central open passage 74 thereof. The netting 71 is continuously fed between the canted rollers 79, 80, supported on mandrel 83 which is supported at its far end on the core of the extrusion die 80. The netting 71 moves into position to receive the fibers 76 spun from the orifices 77 of spinning die 78.

As the extrudable polymeric material, there can be used not only any of the thermoplastic netting materials used in form the fibers, but also, in addition, materials such as polycarbonates, polyoxymethylene, polytetrafluoroethylene, polychlorotrifluoroethylene, phenol-formaldehyde, urea-formaldehyde, melamine-formaldehyde, epoxy and polyvinyl fluoride polymers.

The fibers 76 are spun onto this mandrel 71 in the same manner as in FIG. 1, and the composite core-plus-filter element 75 formed thereon is drawn forward and flattened by rollers 81, 82, and the resulting bilayered sheet 84 with internal bilayered netting 71 is then wound up on storage roll 85.

FIGS. 8 and 9 show a spirally wound filter element made of the double-layered collapsed tubular sheet material 84, 71 that is obtained using the system of FIG. 7. The tube has two layers 40 and 41 which are attached together at their edges because of the tubular nature of the sheet.

The double-layered tubular sheet 84, 71 is spirally wound on a cylindrical core 42 provided with a longitudinal slot 43. One end 44 of the tube 84 is attached to the slot, and the tubing is then rolled several turns around the core, interleaved with another strip 45 of netting which serves as an external spacer for fluid flow. The internal netting 71 serves as an internal spacer for fluid flow. The outer end 46 of the tubular sheet is sealed. Fluid passes edgewise along the interleaved external strip 45, thence through the tube walls 40, 41, into the exterior of the tube 84 along the netting 71 into the core 43 and thus into the open interior 47 of core 42, which is closed at one end 48 so that all the fluid is delivered through the aperture 49 at the other end. The core has an O-ring seal 50 for sealing attachment to a filter assembly (not shown).

In an alternative configuration, strips of flat tubular web with the internal tube of flat tubular netting can be closed at one end, and the other attached to a tube sheet, by means of which a multiplicity of such tubes are connected to a single outlet, forming a large area "parallel plate" filter.

The apparatus shown in FIG. 10 is designed for intermittent or batch operation, applying a cylindrical fibrous layer to a tubular foraminous core, one or several at a time, but while rotating and not advancing the core during laydown. The core 32 is preformed and made of plastic material such as polypropylene and has a plurality of circumferential surface ridges 39a spacing the fibrous layer that is laid down thereon from the slots 39b defined therebetween and the openings 39c at the base of the slots 39b, for flow of liquid to or from the open interior 38 of the core, through the core to the exterior thereof. Spacers 37 are placed on each end of the core 32 to support a lap 15b extending beyond the core at each end.

The spinning die 30 in this case is set parallel to the core, which during laydown is supported on the mandrel 34, so that all orifices 31 at the lower end of the die are at the same distance from the core. The result is that the fibers emerging from the end 33 have the same distance to travel before they reach the core 32, and consequently the fibrous layer that is laid down on the core has a uniform density from top to bottom and from end to end of the filter cylinder 32a that is formed.

The length of the spinning die 30 corresponds to the length of the desired filter cylinder 32a plus the laps 15b at each end, and laydown is continued until a fibrous layer 15c and laps 15b of the desired thickness superimposed on the core are obtained.

Because the spinning die is the same length as the core plus spacers, they are deposited not only covering over the full length of the core, but also extend a short distance beyond the core end, as best seen in FIG. 11, forming a lap 15b. These laps 15b make it possible to attach the end caps 26', 27' to the resulting cylinder without use of a sealing agent or bonding agent to ensure a leak-tight seal. If desired, the laps may be trimmed to length such as to provide a neat internal element configuration, with no projecting web.

Following completion of the laydown, the finished filter cylinder is withdrawn from the mandrel 34, and another core substituted, whereupon the operation is repeated.

End caps 26', 27' of the special configuration shown in FIG. 11 are then applied to the ends of the filter cylinder. Each end cap has on its internal face a tapered slot 26a', 27a' defined between the projecting members 26b', 27b' and 26c', 27c'. Application at the end cap to the filter cylinder folds down the lap 15b on itself, tucking the edge on the inside 38 of the core, about the end of the core, and since the slot is tapered, as the end cap is applied the porous material is compressed in the tapered portion, in a manner such that the porosity of the layer 15c there is less than in the other portion of the layer, which is adequate for sealing purposes. Inasmuch as the end of the fibrous layer is on the inside of the core, and the fibrous layer is compressed sufficiently in the tapered portion such at the filter is not bypassed by particles larger than those removed in the medium at the end of the cylinder, the ends are effectively sealed. Since the filter element is held in a filter assembly by axially directed clamping at the end caps, there is no tendency for the end caps to become dislodged in use. Consequently, no sealing compound or bonding agent need be applied, and is not applied in the structure shown in FIGS. 11 and 12, although of course it can be, if desired, or sealing can be accomplished by softening one or more of the parts, with or without compression.

The following Examples in the opinion of the inventor represent preferred embodiments of the invention.

EXAMPLE 1

Three polypropylene tubes serving as cores 2½ inches in outside diameter and 3 inches long with a number of circumferential ridges each 0.05 inch wide and with four evenly spaced openings each 1/16th inch in diameter at the base of each slot, between the ridges, 0.089 inch wide, were placed on a mandrel in the apparatus of FIG. 10, approximately 5 inches from the nozzles of a 40 inch wide extrusion die or fiberizer fitted with 20 0.015 inch diameter resin orifices or nozzles per linear inch, these orifices or nozzles being surrounded by hot air effluent from slots located above and around the nozzles. The polypropylene tubes had tapered flanges at each end (see FIGS. 10 to 12) spacing the tubes ½ inch apart.

Polypropylene resin was extruded through the orifices at a rate of approximately 11 lbs/hour, and the air flow was adjusted to attenuate the spun fibers to a diameter of 4 microns. The polypropylene tube was rotated at about 40 RPM, and laydown continued until an approximately 1/64 inch thick web of entangled fibers had collected on the core. The resultant cylinder with the fibrous layer on the core was then removed from the mandrel. The outside diameter was 2 17/32 inches, and the internal diameter was was 2¼ inches. The laps of the cylinder at the ends of the layer were pushed over the ends of the tube and into the interior of the tube by the end caps which were of the configuration shown in FIG. 11. The end caps were sealed to the ends by compression of the filter medium, so that no bonding agent was required. The filter element was strong and rigid. While examination of the cut ends showed a laminar appearance, it was not possible to unravel the fibrous layer by picking at the last lap with one's finger nails. Microscopic examination showed a quite uniform pore diameter of approximately 15 microns. Ability to remove particles was further checked by passing a suspension of glass beads through the assembly, which indicated the largest pore diameter to be 9.5 microns. The filter element was useful for filtering gases or liquids.

EXAMPLE 2

Using the system of FIG. 4, a tubular core of polypropylene is extruded with an inside diameter of 1 inch and an outside diameter of 1.30 inches and is continuously perforated as it issues from the die. Polypropylene polymer is spun at 630° F at a rate of 11 pounds per hour onto this core which is rotating at 135 RPM. The filter cylinder of polypropylene fibers is drawn off at 2 ¾ inches outside diameter. The composite filter cylinder on the core is drawn forward at a rate of 1 ¼ feet per minute, and cut into lengths of 9 ⅝ inches, which are then bonded to end-caps to produce filter cartridges useful to filter both gases and liquids.

EXAMPLE 3

Using the system of FIG. 7, a tubular core of polypropylene netting is extruded, having an open mesh rigid structure with diamond shaped openings approximately 0.12 × 0.12 inch. This netting has an inside diameter of 1 inch and an outside diameter of 1.25 inches. Polypropylene polymer is spun at 625° F at a rate of 11 pounds per hour onto this mandrel which is rotating at 135 RPM. The filter cylinder of polypropylene fibers is 2.00 inches outside diameter. The composite filter cylinder on the core is drawn forward at a rate of 2 ½ feet per minute, and cut into lengths of 9 ⅝ inches, when they are end-capped to produce the filter cartridges shown in FIGS. 8 and 9. These are useful to filter both gases and liquids.

EXAMPLE 4

An array of polypropylene tubes serving as cores, each 2 ½ inches in outside diameter and 3 inches long, with interdigitated ends fitting over spacers, and circumferential ridges each 0.05 inch wide and with four openings in the base of each slot between the ridges, spaced 90° apart circumferentially, and each 1/16 inch in diameter, the slots being 0.089 inch wide, were fitted together in an array as shown in FIG. 1 and the array continuously rotated and translated to the right by the canted rolls 20, 21, at a distance approximately 5 inches away from the nozzle of the fiberizer. As the completed cylinders were removed at the righthand end fresh cores were added at the lefthand end, so that the laydown could be continuous, and the array in effect endless.

The fiberizer was 40 inches long, and was fitted with twenty 0.015 inch diameter resin orifices per linear inch, these orifices being surrounded by hot air effluent from slots located above and around the nozzles. The spacers spaced the tubes ⅛ inch apart.

Polypropylene resin was extruded through the orifices at the rate of approximately 11 pounds per hour, and the air flow adjusted to attenuate the spun fibers to a diameter of 4 microns. The polypropylene tube-and-spacer array was rotated at about 40 RPM, and laydown continued until an approximately 1/64 inch web or layer of entangled fibers had been collected on the cores. The resultant cylinders with the fibrous layers on the cores were then removed from the array, as they left the nip between the rolls 21 and were cut off by the cutter 22.

The outside diameter of the cylinders was 2 17/32 inches and the interior diameter was 2 ¼ inches. The portions of the layer that had extended over the spacers, approximately ¼ inch long, were folded over the ends of the core tube and into the interior of the core tube, and the end caps then pressed on the ends, so that the folded-over portion was compressed in the circumferential slot of the end caps. No bonding agent was used, and the resulting filter assembly was strong and rigid. Microscopic examination showed a quite uniform pore diameter of approximately 15 microns.

The tightness of the seal between the filter cylinder and the end caps was tested by subjecting the end-capped filter elements to the bubble point test described in U.S. Pat. No. 3,007,334, patented Nov. 30, 1956. The first bubble appeared on the cylinder, and not at the end cap, showing that the porosity at the end caps was less than that on the cylinder, and therefore, that the end cap seal was sufficiently tight. The ability to remove particles was further checked by passing a suspension of glass beads through the filter element, which indicated the largest pore diameter to be 9.5 microns. The filter element was useful for filtering gases or liquids.

EXAMPLE 5

A polypropylene tube serving as a core, 2 ½ inches in outside diameter and 3 inches long, with a number of circumferential ridges each 0.05 inch wide and with four evenly spaced openings each 1/16th inch in diameter at the base of each slot, between the ridges, 0.089 inch wide, was fitted with a spacer at each end, and placed on a mandrel in the apparatus of FIG. 10, approximately 5 inches from the nozzles of a 40 inch wide extrusion die or fiberizer fitted with 20 0.015 inch diameter resin orifices or nozzles per linear inch, these orifices or nozzles being surrounded by hot air effluent from slots located above and around the nozzles. The polypropylene tube had a tapered flange at each end (see FIG. 10).

Polypropylene resin was extruded through the orifices at a rate of approximately 2 pounds per hour, and the air flow was adjusted to attenuate the spun fibers to a diameter of 4 microns. The polypropylene tube was rotated at about 40 RPM, and laydown continued until an approximately 1/64 inch thick web of entangled fibers had collected on the core. The resultant cylinder and attached spacers with the fibrous layer on the core and spacers was then removed from the mandrel, and lap at each end trimmed to about ⅜ inch long. The spacers were then pulled out, leaving a trimmed lap at each end. The outside diameter of the cylinder was 2 17/32 inches, and the internal diameter was 2 ¼ inches. The laps were pushed over the ends of the core, and into the interior of the core by the end caps, which were of the configuration shown in FIG. 11. The end caps were sealed to the ends by compression of the filter medium, so that no bonding agent was required. The filter element was strong and rigid. While examination of the lap ends showed a laminar appearance, it was not possible to unravel the fibrous layer by picking at the last lap with one's finger nails. Microscopic examination showed a quite uniform pore diameter of approximately 15 microns. Ability to remove particles was further checked by passing a suspension of glass beads through the assembly, which indicated the largest pore diameter to be 9.5 microns. The filter element was useful for filtering gases or liquids.

The tightness of the seal between the filter cylinder and the end caps was tested by subjecting the filter elements to the bubble point described in U.S. Pat. No. 3,007,334, patented Nov. 30, 1956. The first bubble appeared on the cylinder, and not on the end cap, showing that the porosity at the end caps was less than that at the cylinder, and therefore that the end-cap seal was sufficiently tight. The ability to remove particles was further checked by passing of a suspension of glass beads through the filter element, which indicated the largest pore diameter to be 9.5 microns. The filter element was useful for filtering gases or liquids.

Preferred types of spinning dies are described in (1) the report *Manufacture of Superfine Organic Fibers*, U.S. Department of Commerce, Office of Technical Services, from the Naval Research Laboratory, (2) the article by Van A. Wente, *Ind. & Eng. Chem.*, Vol. 48, No. 8, pp. 1342-1346, August, 1956, and (3) the report An Improved Device for the Formation of Superfine Thermoplastic Fibers by Lawrence, Lucas & Young, U.S. Naval Research Laboratory, Feb. 11, 1959, the disclosures of which three reports are hereby incorporated by reference. One type of spinning die of these reports has been illustrated in FIGS. 2 and 3.

Having regard to the foregoing disclosure, the following is claimed as the inventive and patentable embodiments thereof:

1. A seamless tubular filter element comprising a tubular foraminous core having superimposed and supported thereon in the form of a cylinder a flexible wound layer of randomly-oriented heterogeneously intertwined spun fibers less than 10 $\mu$in diameter and having an open area of at least 60%, laid down on the core and having end caps at each end of the cylinder, the end caps having a circumferential relatively narrow slot about the periphery of their inside face whose width at the inside face is less than the thickness of the end of the core plus the folded-over thickness of the layer; the layer having at each end a flexible selvage extending beyond the end of the core and folded over the end and extending into the interior of the core, with the folded-over portion sealingly compressed in the slot between the core end and the side walls of the slot, and thereby attached to the end caps in a leak-tight seal.

2. A seamless tubular nonwoven web according to claim 1 in which the fibers are less than 1μ in diameter.

3. A seamless tubular nonwoven web according to claim 1 in which the open area is at least 85%.

4. A seamless tubular nonwoven web according to claim 1 in which the core, fibrous layer and end caps are all of the same synthetic polymer.

5. A seamless tubular nonwoven web according to claim 1 in which the core, fibrous layer and end caps are all of polypropylene.

6. A seamless tubular nonwoven web according to claim 1 in which the slot has inwardly tapered sides.

7. A seamless tubular nonwoven web according to claim 1 in which the slot has parallel sides.

8. A seamless tubular nonwoven web according to claim 1 in which the slot has a width equal to the thickness of the end of the core plus less than one-half the thickness of the folded-over layer.

* * * * *